United States Patent [19]
Nagano et al.

[11] Patent Number: 5,223,964
[45] Date of Patent: Jun. 29, 1993

[54] LIQUID CRYSTAL DISPLAY DEVICE HAVING A SPACER COMPOSED OF SPHERICAL PARTICLES HAVING A PARTICULAR COEFFICIENT OF VARIATION IN PARTICLE DIAMETER AND AN AGGREGATION RATIO

[75] Inventors: Kiyoshi Nagano; Michio Komatsu; Yoshichika Tanaka; Takahumi Ishikubo, all of Kitakyushu, Japan

[73] Assignee: Catalysts & Chemicals Industries Co., Ltd., Tokyo, Japan

[21] Appl. No.: 852,254

[22] PCT Filed: Oct. 2, 1991

[86] PCT No.: PCT/JP91/01324

§ 371 Date: Jun. 1, 1992

§ 102(e) Date: Jun. 1, 1992

[87] PCT Pub. No.: WO92/06403

PCT Pub. Date: Apr. 16, 1992

[30] Foreign Application Priority Data

Oct. 2, 1990 [JP] Japan .................................. 2-265532

[51] Int. Cl.⁵ .............................................. G02F 1/133
[52] U.S. Cl. ............................................................ 359/81
[58] Field of Search ............................................. 359/81

[56] References Cited

U.S. PATENT DOCUMENTS

5,029,985 7/1991 Suzuki et al. ..................... 359/81
5,044,733 9/1991 Kamoi et al. ..................... 359/81

FOREIGN PATENT DOCUMENTS

62-269933 11/1987 Japan .
62-275005 11/1987 Japan .
62-278535 12/1987 Japan .
63-73225  4/1988 Japan .
63-89408  4/1988 Japan .
63-94224  4/1988 Japan .
1-78227   3/1989 Japan .
1-234826  9/1989 Japan .
1-310023 11/1989 Japan .
2-80155   3/1990 Japan .
2-92810   4/1990 Japan .
2-122403  1/1992 Japan .

Primary Examiner—William L. Sikes
Assistant Examiner—Huy K. Mai
Attorney, Agent, or Firm—Webb, Burden, Ziesenheim & Webb

[57] ABSTRACT

In the liquid crystal display devices according to the present invention, the spacer used for deciding the cell gap of the display cell comprises spherical particles having a Cv value of not more than 2% and an aggregation ratio of not more than 5%, hence the occurrence of irregular density and irregular color of the displayed images is inhibited and also the formation of cold bubbles in the display cell is inhibited.

15 Claims, 1 Drawing Sheet

LIQUID CRYSTAL DISPLAY DEVICE HAVING A SPACER COMPOSED OF SPHERICAL PARTICLES HAVING A PARTICULAR COEFFICIENT OF VARIATION IN PARTICLE DIAMETER AND AN AGGREGATION RATIO

FIELD OF INDUSTRIAL APPLICATION

This invention relates to liquid crystal devices, and more particularly to liquid crystal devices capable of keeping a definite distance between transparent electrodes thereof.

TECHNOLOGICAL BACKGROUND

Liquid crystal display devices are being used widely as display device in clock, computer, will television and the like. The liquid display device is a display device using a liquid crystal, the molecular arrangement of which changes when only a slight voltage is applied thereto, thereby varying the direction of polarization, and the display device usually comprises two electrodes and a liquid crystal layer held between said electrodes.

In the liquid crystal display device of the type mentioned above, it is desirable that the distance between the electrodes, that is, a cell gap, is uniform.

If the cell gap formed in liquid crystal display device mentioned above is not uniform, the electric field applied to the liquid crystal layer comes to have partial irregularity in strength. On that account, the contrast ratio of the image formed on the display device varies depending on the spot, whereby irregular density are formed in the image, or alternatively irregular color of the image happens when said image is formed by such a display system as STN. Further, the response speed of liquid crystal to an input signal varies regularly according to the cell gap and strength of the electric field, but if the cell gap is not uniform, said response speed varies irregularly, failing to give clear images.

For that reason, it was a common practice in the field of liquid crystal display devices to form a uniform liquid crystal layer between a pair of electrodes in a liquid crystal device by charging a liquid crystal into a space between a pair of electrodes wherein a particulate spacer composed of an insulator is lying.

For example, Japanese Patent L-0-P Publn. No. 78227/1989 proposes that the use as the above-mentioned spacer of spherical particles having a standard deviation of not more than 0.3 $\mu$m dispersed between a pair of electrodes in order to prevent discoloration from displayed image.

Further, Japanese Patent L-0-P Publn. No. 269933/1987 discloses the use as a spacer for a liquid crystal display panel of silica particles having a coefficient of variation (CV value) of not more than 10.0%, said CV value indicating uniformity of particle diameter of said silica particles, and in the example of said patent publication, there are used silica particles having a CV value of 8%.

When spacer particles having such standard deviation and CV value as defined in the cited publications mentioned above are used in liquid crystal display devices of the ordinary type, it is possible to prevent displayed images from irregular density or irregular color to a certain extent without relying upon the length of the cell gap. However, in the case of a liquid crystal display device using such a liquid crystal as a ferroelectric liquid crystal and having a small cell gap such as 1 to 2 $\mu$m, the cell gap to be adopted therein is required to be smaller in gap irregularity. Further, in the case of a liquid crystal display device using STN liquid crystal, if the cell gap is large in length, a specific interference color is unobtainable, resulting in displaying irregularities, hence the cell gap adopted therein is required to be uniform all the more.

Extensive researches conducted by the present inventors with the view of obtaining liquid crystal display devices free from displaying irregularities have resulted in the finding that such excellent liquid crystal display devices as aimed at above are unobtainable by the use of spherical particles merely having a small CV value mentioned above as the spacer for liquid crystal display cell.

That is, it has been found that even when the spherical particles used have a CV value of not more than 10.0%, if the proportion of aggregated particles becomes large, irregularities of the cell gap take place and, at the same time, cold bubbles are formed.

By cold bubbles as used herein are meant air bubble-like matters formed in the cell gap in the following manner.

That is, when a liquid display device is exposed to such a low temperature of below an ice point (0° C.), by shrinkage of the liquid crystal sandwiched between a pair of transparent electrodes, space portions are formed partially between at least one of the transparent electrodes and liquid crystal and these space portions remain as so-called "cold bubbles" even when the liquid crystal display device is warmed to room temperature.

The present invention is intended to solve such problems associated with the prior art as mentioned above, and an object of the invention is to provide liquid crystal display devices in which irregular density and irregular color of the displayed images are inhibited assuredly all the more and, moreover, no cold bubbles occur.

DISCLOSURE OF THE INVENTION

The liquid crystal display devices of the present invention comprising a pair of transparent substrates having formed thereon a transparent electrode, said transparent substrates being arranged so that said transparent electrodes may be opposite to each other through a spacer interposed between said transparent electrodes, are characterized in that the spacer is composed of spherical particles having a coefficient of variation (CV value) in particle diameter of not more than 2% and an aggregation ratio of not more than 5%.

PREFERRED EMBODIMENT OF THE INVENTION

Figure 1:
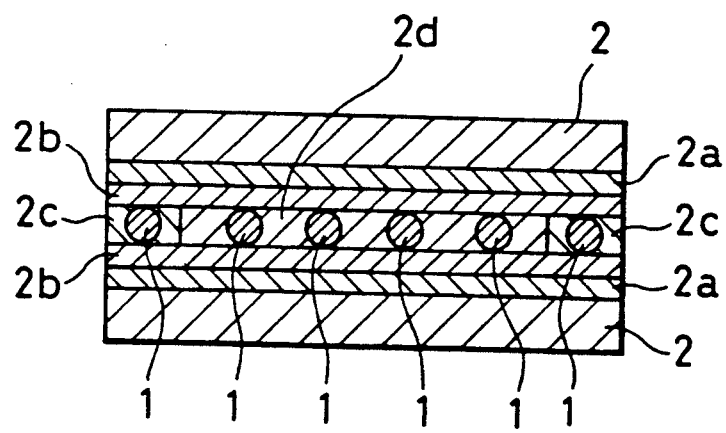
FIG. 1 is a sectional view showing schematically a liquid crystal display cell of the liquid crystal display device of the present invention.

The liquid crystal display devices of the present invention are illustrated below in detail.

In the liquid crystal display cell of the liquid crystal display devices of the invention, for example, as shown in FIG. 1, a pair of substrates 2 each having thereon a transparent electrode 2a are arranged so that the transparent electrodes 2 may be opposed to each other through spherical particles 1 interposed between said transparent electrodes 2. This transparent electrode 2 may be provided on its surface with an alignment film 2b. Further, a sealing resin 2c may be provided on the peripheral portions of the transparent substrates 2, and a liquid crystal 2d is sealed up inside the cell surrounded by the sealing resin 2c.

According to the invention, a plurality of spherical particles 1 having the following characteristics are dispersed in the liquid crystal 2d thus sealed up. Such spherical particles may also be dispersed in the sealing resin 2c.

The spherical particles used in the invention as the spacer for liquid crystal display cell in the manner as mentioned above have a coefficient of variation in particle diameter (CV value) of not more than 2%, preferably not more than 1.5% and an aggregation ratio of not more than 5%, preferably not more than 3%.

The CV value as mentioned above may be calculated, for example, on the basis of the following equation after obtaining an average particle diameter D and a standard deviation $\delta$ of the spherical particles by analyzing an enlarged photographic image of said spherical particles by an electron microscope using an image analyzer.

$$CV = (\delta/D) \times 100$$

The aggregation ratio may be calculated, for example, on the basis of the following equation after counting the number n of aggregated particle comprising at least two particles joined together and the number N of all particles in the predetermined zone of an enlarged photographic image of the spherical particles by means of an electron microscope.

$$\text{Aggregation ratio} = (n/N) \times 100$$

The spherical particles having such a specific CV value and aggregation ratio as defined above may be obtained, for example, by preparing spherical particles according to the following procedure. In cases where the spherical particles thus obtained have a CV value and an aggregation ratio exceeding those as defined above, said spherical particles are subjected to elimination of aggregated particles or adjustment of particle size distribution by means of centrifugal separation, sedimental separation or classification using a sieve, whereby desired spherical particles are obtained.

(1) A procedure wherein a metal alkoxide is hydrolyzed in a water/alcohol dispersion of a metal oxide or metal hydroxide as a seed particle, while keeping said dispersion under alkaline conditions, and the hydrolyzate of the metal alkoxide is allowed to deposit on the seed particle present in the dispersion, thereby effecting the growth of the seed particle (Japanese Patent L-0-P Publn. No. 275005/1987).

(2) A procedure wherein the particles grown by the procedure (1) are separated from the dispersion containing the same and the separated particles are heat treated at a temperature of at least 250° C. to obtain black particles (Japanese Patent L-0-P Publn. No. 89408/1988).

(3) A procedure wherein tetraethoxysilane is hydrolyzed in a water/organic solvent dispersion of a metal oxide or metal hydroxide as a seed particle in the presence of alkoxysilane represented by the following formula

 (I)

wherein n is 1 to 4, and the hydrolyzate of the tetraethoxysilane is allowed to deposit on the seed particle present in the dispersion, thereby effecting the growth of the seed particle (Japanese Patent Appln. No. 310023/1989). When spherical particles are intended to prepare by this procedure, it is preferable to use alkoxysilane of the formula [I] in an amount, based on 1 mole of the tetraethoxysilane, of $0.05 \times 10^{-2}$ to $6.0 \times 10^{-2}$ mole (in terms of $SiO_2$).

(4) A procedure wherein tetraalkoxysilane and a silicic acid solution are added to a water/organic solvent dispersion of a metal oxide or metal hydroxide as a seed particle, and the resulting hydrolyzate of the tetraalkoxysilane and the resulting silicic acid polymerizate are allowed to deposit on the seed particle, thereby effecting the growth of the seed particle (Japanese Patent Appln. No. 122403/1990).

(5) A procedure wherein to a water/alcohol dispersion of a metal oxide or metal hydroxide as a seed particle is added an alkoxide of a metal different from the metal contained in the seed particle or a mixture comprising at least two metal alkoxides, at least one of said metal alkoxides containing a metal different from that of the seed particle, and the resulting hydrolyzate of the metal alkoxide is allowed to deposit on the seed particle to form thereon metal oxide layers different in refractive index. Subsequently, if necessary, spherical particles each coated with the above-mentioned metal oxide layers are used as a seed particle, and the same procedure as above is repeated to coat the seed particle with other metal oxide layers (Japanese Patent Appln. No. 80155/1990).

The spherical particles obtained by the procedure (1), (2), (3), (4) or (5) mentioned above may be used after coating them on the surface with a synthetic resin. The synthetic resin used in this case includes preferably those which will not prevent orientation of the liquid crystal used, and such resins may contain a coupling agent or surfactant for improving adhesion of the resin to the particle.

Such synthetic resins may be coated on the surface of the spherical particles by the method known, per se. Further, as described in Japanese Patent L-0-P Publn. No. 94224/1988, particulate synthetic resin having a particle diameter d of not more than D/5 (wherein D is a particle diameter of the spherical particles) may be allowed to adhere to the surface of the spherical particles. By applying an impact force to the particles adhered with the particulate synthetic resin by the above procedure, at least a part of the particulate synthetic resin may be fixed to the particle by fusion along with connecting the particulate synthetic resin to each other.

It is also possible to blacken the spherical particles obtained by the procedure (3), (4) or (5) by adopting the same procedure with the procedure (2).

The spherical particles thus subjected to the blackening treatment as mentioned above may be used as a seed particle to obtain black spherical particles.

The procedure (3) mentioned above may be illustrated more in detail herein after.

In this procedure, a water/organic solvent dispersion of a seed particles is used. The organic solvent used as a dispersion medium is not limited only to alcohol but may be organic solvents having good miscibility with water and alcohol and also with alkoxysilane, or may be mixed solvents of such an organic solvent and alcohol.

The organic solvents exhibiting such properties as mentioned above include glycols such as ethylene glycol, esters such as ethyl acetate, and ketones such as methyl ethyl ketone.

In the procedure (3), tetraethoxysilane is hydrolyzed in the seed particle dispersion maintained under alkaline conditions, and the seed particle is allowed to grow by depositing the resulting hydrolyzate of tetraethoxysilane on said seed particle.

At the time of hydrolysis of this tetraethoxysilane, one or two or more of methoxysilanes represented by the following formula [I] are allowed to coexist with said tetraethoxysilane.

$$(CH_3O)_n \cdot (C_2H_5O)_{4-n} \cdot Si \qquad [I]$$

wherein n is 1 to 4.

The methoxysilanes used herein are organosilicon compounds represented by the above-mentioned formula [I] including concretely monomethoxytriethoxysilane, dimethoxydiethoxysilane, trimethoxymonoethoxysilane and tetramethoxysilane.

The above-exemplified methoxysilanes may be mixed in advance with tetraethoxysilane and the mixture is added to the seed particle dispersion, or said methoxysilanes may be added to the seed particle dispersion simultaneously with said tetraethoxysilane. The methoxysilanes are desirably used in an amount (in terms of $SiO_2$) of $0.05 \times 10^{-2}$ to $6.0 \times 10^{-2}$ mole, preferably $0.1 \times 10^{-2}$ to $5.0 \times 10^{-2}$ mole based on 1 mole of the tetraethoxysilane.

If the amount of the methoxysilanes used is less than $0.05 \times 10^{-2}$ mole based on 1 mole of the tetraethoxysilane, the addition effect of methoxysilanes is scarcely observed and seed particles newly formed are observed sometimes. On the other hand, if the amount of the methoxysilanes used exceeds $6.0 \times 10^{-2}$ mole based on 1 mole of the tetraethoxysilane, the hydrolysis of the tetraethoxysilane is accelerated excessively, and prior to the deposition of the resulting hydrolyzate of the tetraethoxysilane on the seed particles, said hydrolyzate come sometimes to form together new seed particles.

The methoxysilanes added to the reaction system are hydrolyzed simultaneously with the tetraethoxysilane, and the resulting hydrolyzate is deposited onto the seed particle.

In the procedure mentioned above, the tetraethoxysilane is usually added continuously to the seed particle dispersion at a predetermined rate, but portions of a predetermined amount of said tetraethoxysilane may be added intermittently.

When the tetraethoxysilane is added to the seed particle dispersion, the dispersion varies in pH, owing to hydrolysis of said tetraethoxysilane. It is not desirable that this dispersion comes not to indicate alkalinity, because the seed particles aggregate or new seed particles are formed in some cases and the particles obtained eventually become broad in particle size distribution. On that account, the tetraethoxysilane is added to the seed particle dispersion maintained in such a manner as to maintain the pH of the dispersion in the range of from 10 to 13. The dispersion may be maintained under the alkaline condition by the addition of alkali thereto, and the alkali used herein includes concretely ammonia gas, ammonia water, amines, alkali metal hydroxides and quaternary ammonium salts, either singly or in combination.

The temperature at which the hydrolysis of tetraethoxysilane is conducted is not particularly limited, but if said temperature employed is higher than the boiling point of water or alcohol, it is desirable that the seed particle dispersion is maintained under pressure so as to be kept in a liquid state.

In depositing the resulting hydrolyzate of the tetraethoxysilane onto the seed particle, it is desirable that the concentration of the alcohol in the reaction system is maintained at 35 to 97% by weight. If the alcohol concentration is less than 35% by weight, the seed particle dispersion becomes poor in miscibility with the tetraethoxysilane to be added thereto and is emulsified, whereby the seed particles aggregate or particles of not spherical but of an indeterminate form are liable to form. On the other hand, if the alcohol concentration is in excess of 97% by weight, the hydrolysis of the tetraethoxysilane tends to retard excessively. The alcohol concentration in the reaction system may be adjusted by addition to the reaction system of water and alcohol together with the tetraethoxysilane, and the preferable amount, based on 1 mole of the tetraethoxysilane, of alcohol added is not more than 10 moles and that of water added is 2.0 to 24.0 moles.

The procedure (4) as mentioned before is illustrated below in more detail.

In this procedure, a water/organic solvent dispersion of seed particles is used. The dispersion medium used herein is not limited only to alcohol, but may be organic solvents having good miscibility with water and alcohol and also with tetraalkoxysilane and silicic acid solution, or mixed solvents comprising such organic solvents and alcohol.

The seed particle concentration in the seed particle dispersion is desirably 0.05 to 20% by weight in terms of the oxide. If the seed particle concentration as mentioned above is less than 0.05% by weight, new seed particles are formed in the step of growing the seed particles as will be mentioned later in some cases and the silica particles obtained eventually are liable to have irregular particle diameters. On the other hand, if the seed particle concentration exceeds 20% by weight, the particles tend to aggregate during the step of particle growth and the particles thus aggregated come to exert an adverse influence upon uniformity of particle diameter of the particles aimed at.

The tetraalkoxysilane and silicic acid solution are added to such a seed particle dispersion as mentioned above, while maintaining said dispersion under the alkaline condition.

The tetraalkoxysilane used herein may be represented by the general formula $Si(OR)_4$ wherein R is alkyl of 1–7 carbon atoms, preferably 1–4 carbon atoms. Such tetraalkoxysilane as mentioned above includes concretely tetramethoxysilane (methyl silicate), tetraethoxysilane (ethyl silicate), tetraisopropoxysilane, tetrabutoxysilane, etc.

The tetraalkoxysilanes may be used, as they are, or after dilution with alcohol, etc.

The silicic acid solution used herein is an aqueous solution of a low polymerizate of silicic acid, which is obtained by subjecting an aqueous solution of alkali silicate such as sodium silicate to dealkalization treatment with a cation exchange resin.

The silicic acid solution used preferably includes those having the silicic acid concentration in terms of $SiO_2$ of about 0.1 to 10% by weight.

The tetraalkoxysilane and silicic acid solution as mentioned above may be added to the above-mentioned seed particle dispersion by any of such processes as (a) the tetraalkoxysilane and silicic acid solution are added simultaneously to the dispersion, (b) these two compounds are added alternately over a several times, and (c) the tetraalkoxysilane is added alone first to the seed particle dispersion, whereby the seed particles are allowed to grow, and the silicic acid solution is added last of all.

Of the processes illustrated above, the process (b) relying on the alternating addition is preferred, and by the use of this process (b), it becomes possible to stabilize the dispersion and the resulting particles.

In practicing the process (b), the amount of the tetraalkoxysilane or the silicic acid solution used at each alternating addition step is not particularly limited, but any appropriate amount may be used alternately.

In the present invention, it is preferable that the outermost layer of the silica particles obtained ultimately is formed from a polymerizate of silicic acid. Accordingly, it is preferable to use the silicic acid solution at the final stage of the addition.

The addition to the seed particle dispersion of the tetraalkoxysilane and silicic acid solution in the manner as illustrated above brings about hydrolysis reaction of the tetraalkoxysilane and polymerization reaction of the silicic acid, and the reaction products resulting therefrom deposit on the seed particles which then grow in particle diameter. Further, when the pH of the reaction system decreases and approaches neutrality, not only the resulting seeds tend to aggregate but also new seed particles are liable to form, hence the silica particles obtained ultimately tend to be irregular in particle diameter. On that account, when the tetraalkoxysilane and silicic acid solution are added to the seed particle dispersion, it is preferable to maintain the dispersion at the pH range of 9 to 14, preferably from 10 to 13. It is preferable that the pH of the dispersion does not undergo fluctuation, if possible, within the above-mentioned range.

The dispersion may be maintained under the alkaline condition by the addition to the reaction system of alkali, and concretely by the use of ammonia gas, ammonia water, amines, alkali metal hydroxides, quaternary ammonium salts, etc., either singly or in combination.

The temperature of the reaction system to be employed in the course of particle growth is not particularly limited, but if a temperature above the boiling point of water or alcohol is employed at that time, it is desirable that the seed particle dispersion is maintained under pressure so as to be kept in a liquid state.

In the above-mentioned process, it is preferable that the alcohol concentration in the reaction system is 35 to 97% by weight. When the alcohol concentration employed is less than 35% by weight, the alcohol decreases in miscibility with the tetraalkoxysilane, whereby the seed particle dispersion tends to undergo emulsification and the seed particles aggregate or particles of not spherical but of an indeterminate form are liable to form. On the other hand, if the alcohol concentration is in excess of 97%, the hydrolysis of the tetraalkoxysilane tends to retard excessively.

The alcohol concentration in the reaction system may be adjusted by the addition to said system of water and alcohol. In that case, it is desirable that the amount, based on 1 mole of the tetraalkoxysilane (in terms of $SiO_2$), of water is 2.0 to 24.0 moles and that of the alcohol is 0.4 to 1.1 moles.

The silica particles obtained by adding the tetraalkoxysilane and silicic acid solution to the seed particle dispersion in the manner now described are composed of a metal oxide or metal hydroxide as a core, a hydrolyzate of the tetraalkoxysilane and a polymerizate of the silicic acid. This silica particle may have such a structure that a mixture of the above-mentioned hydrolyzate and polymerizate is deposited as a layer onto the core so as to be coated thereon, a layer of said hydrolyzate and that of said polymerizate are deposited alternately on the core, or the core coated with a layer of said hydrolyzate is coated with a layer of said polymerizate as the outermost layer. In any of the structures mentioned above, it is desirable that the outermost layer of the particle is a layer composed of the polymerizate of silicic acid.

The silica particles as mentioned above are spherical, have a sharp particle size distribution, and are monodispersed in the dispersion medium without being aggregated. According to the processes mentioned above, there may be obtained silica particles having any desired particle diameter such as those having a small particle diameter of about 0.01 $\mu$m or a large particle diameter of at least 10 $\mu$m. The concentration in the dispersant of the silica particles can be increased to such a high concentration as about 20.0% by weight of in terms of $SiO_2$, thus this concentration is markedly higher than that obtained in the prior art processes. Accordingly, it is possible to increase the production efficiency of the silica particles and also diminish the production cost.

The dispersion having monodispersed therein the silica particles obtained by the above-mentioned processes according to the present invention may be concentrated to increase further its particle concentration up to about 60.0% by weight.

By the addition of such a stabilizer as alkali to the dispersion having monodispersed therein the spherical silica particles by the present processes mentioned above, a higher stability of said spherical particles in the dispersion can be obtained, thus the particles in the dispersion will not aggregate for a long period of time owing to such aging as mentioned above. It is also possible to substitute the alcohol contained in the dispersion with another organic solvent.

In the aforementioned procedure (5), hydrolysis of a metal alkoxide contained in the seed particle dispersion is carried out under the same conditions as in the aforementioned procedure (1), (3) or (4). The particles obtained by this procedure (5) are composed of a seed particle as a core and thereon a lamination layer of a metal oxide different in kind of metal or in composition, that is, a metal oxide layer different in refractive index from the core. Further, on this metal oxide layer there may be laminated concentrically one or two or more metal oxide layers in succession.

In the particles having such a laminated structure as comprising a single metal oxide layer or a plurality of metal oxide layers on the seed particle, when this single metal oxide layer has a refractive index higher than that of the seed particle or one metal oxide layer laminated on an arbitrary metal oxide layer has a refractive index higher than that of said arbitrary metal oxide layer, light which are incident upon the particles undergo irregular reflection, thereby reducing the amount of light passing through the particles. On that account, when the particles having such a laminated structure as mentioned above are used as the spacer for a liquid crystal display device, a contrast of the displayed images can be further exalted. Further, when the particles having such a laminated structure used are black particles, darkness of the image obtained by displaying a positive image becomes inconspicuous.

In the liquid crystal display devices of the present invention, the particles for spacer obtained by the processes according to the invention are dispersed uniformly on a transparent substrate for the conventional liquid crystal display device, for example, the transparent substrate provided with a transparent electrode, an alignment film, etc.

The particles for spacer may be dispersed uniformly on the transparent substrate by a conventional method such as atomizing a dispersion of the particles in a solvent such as alcohol or spraying the particles together with a gas through a spray nozzle over said transparent substrate.

EFFECT OF THE INVENTION

In the liquid crystal display devices of the present invention comprising a liquid crystal potted between a pair of transparent electrodes each formed on a transparent substrate, because of using, as a spacer, specific spherical particles having a CV value of not more than 2% and an aggregation ratio of not more than 5%, there are brought about such effects that irregular density and irregular color of the displayed images can be prevented more assuredly in comparison with the prior art liquid crystal display devices and, moreover, formation of the cold bubbles formed between cell gaps of the liquid crystal display cell can be prevented.

Further, there can be obtained a liquid crystal display device capable of displaying images having a further improved contrast when the above-mentioned spherical particles used as a spacer are those individually laminated with a metal oxide layer different in refractive index from said spherical particle.

The present invention is illustrated below with reference to examples, but it should be construed that the invention is in no way limited to those examples.

EXAMPLE 1

A. Preparation of spherical particles for spacer

In a mixture comprising 3685.5 g of ethanol, 1365 g of pure water and 921.5 g of 28% ammonia water was dispersed 249 g of spherical silica having an average particle diameter of 5.0 $\mu$m (spherical silica having CV: 1.4% and an aggregation ratio: 1.5% obtained by separating aggregated particles of SHINSHIKYU SW-5.0 produced and sold by CATALYSTS & CHEMICALS IND. Co. by means of a centrifugal separator), and 161 g of an aqueous solution containing 1% by weight of NaOH. The mixture thus obtained was subjected to ultrasonic wave treatment to prepare a seed particle dispersion.

This seed particle dispersion was heated at 120° C. in an autoclave and maintained at that temperature. To the dispersion kept in the autoclave was added first 4 g of a silicic acid solution (SiO$_2$ concentration: 5.0% by weight) obtained by dealkalization of an aqueous sodium silicate solution by means of a cation exchange resin, and were then added simultaneously 131.5 g of a mixed solution of ethanol/water/ammonia (weight ratio: 1.0/0.3/0.1) and 21 g of ethyl silicate (28% by weight in terms of SiO$_2$). This operation was repeated so that the outermost layer of the silica particle obtained could be a layer composed of a polymerizate resulted from the silicic acid solution, thus there were added in 5 hours 120.5 g of the silicic acid solution, 3937.5 g of the mixed solution of ethanol/water/ammonia as mentioned above and 625 g of the ethyl silicate in all. To the mixture thus obtained was added 117 g of an aqueous solution containing 1% by weight of NaOH, whereby a dispersion in which the silica particles had been dispersed was obtained by holding said mixture at 150° C. for 1 hour.

The particles were separated from this dispersion containing the same, and the separated particles were dried at 200° C. to obtain the particles for spacer consisting of powdery silica particles.

B Evaluation of particles for spacer

The particles for spacer thus obtained were measured for average particle diameter, CV value and aggregation ratio thereof.

(1) Average particle diameter

The average particle diameter of the particles for spacer was obtained by analyzing an enlarged photographic image of said particles for spacer by an electron micrograph with the use of an image analyzer.

(2) CV value

The Cv value was obtained from the average particle diameter D obtained in (1) mentioned above and a standard deviation $\delta$ obtained by the same image analysis as in the above-mentioned (1) on the basis of the following equation.

$$CV = (\delta / D) \times 100$$

(3) Aggregation ratio

The aggregation ratio was calculated on the basis of the following equation after counting the number n of aggregated particles and the number N of the total particles present in a given region of the above-mentioned photographic image.

$$\text{Aggregation ratio} = (n / N) \times 100$$

Results obtained are shown in Table 1.

C. Preparation of liquid crystal display device

In 100 g of an epoxy resin for sealing was dispersed 1 g of the powdery silica particles obtained above to prepare an ink composition. The ink composition thus obtained was applied to the periphery of an alignment film of a laminate having formed on a polished glass substrate for liquid crystal display device a transparent electrode and an alignment film by means of a screen printer to obtain a substrate for liquid crystal display device.

Subsequently, a dispersion of 0.01 g of the above-mentioned powdery silica particles in 1 liter of ethanol was sprayed over a portion of the substrate for liquid crystal display device other than the portion provided with the above-mentioned sealing resin so that a dispersion density of said powdery silica particles could become about 2,500 pc./cm$^2$. This substrate was then laminated with another substrate for liquid crystal display device prepared in the same manner as above at a temperature of about 150° C. so that the transparent electrodes of these substrates could face each other and a load of about 0.2 g could be applied to one piece of the powdery silica particle, whereby 10 pieces of cell for liquid crystal display device were prepared.

Into the cell for liquid crystal display device thus obtained was injected STN liquid crystal (a product of Merck) to obtain a liquid crystal display device.

D Evaluation of liquid crystal display device

The liquid crystal display device thus obtained was evaluated with respect to its cell gap, discoloration and cold bubbles in the following manner.

(a) Cell gap

Using a film thickness meter (TM-005, manufactured and sold by Canon Inc.), cell gaps of a plurality of spots were measured to obtain an average cell gap and a dispersion (3δ) of cell gap.

(b) Discoloration

The presence of the discoloration of displayed images was judged by visual observation.

(c) Cold bubble

Ten (10) pieces of the cells for liquid crystal display device as prepared above was cooled and maintained at −30° C., and the temperature was raised to ordinary temperature. The cells thus treated were visually observed to find and count the number of cells in which the cold bubbles formed was found.

Results obtained are shown in Table 2.

EXAMPLE 2

To a mixture comprising 487 g of ethanol, 256 g of 28% ammonia water and 205 g of pure water was added 17.5 g of ethyl silicate (28% by weight in terms of $SiO_2$) with stirring at 35° C. Thereafter, the stirring was continued for additional 2 hours to obtain a seed particle dispersion containing silica particles in an amount corresponding to 0.5% by weight in terms of $SiO_2$.

To 974 g of the seed particle dispersion obtained above was first added gradually 2 g of the same silicic acid solution ($SiO_2$ concentration: 5.0% by weight) with stirring at 35° C. as in Example 1, and was then added gradually 47 g of an ethanol/water mixed solution (weight ratio 1.0/0.8) simultaneously with 10.5 g of ethyl silicate (28% by weight in terms of $SiO_2$). In this case, the pH of the reaction mixture was maintained at 11.5 by the addition of ammonia gas.

The above-mentioned operation was repeated until the predetermined amounts of the above-mentioned compounds were added over a period of 19 hours so that the outermost layer of the silica particle could become a layer composed of a polymerizate resulting from polymerization of the silicic acid solution. The total amount of each compound thus added included 117 g of the silicic acid solution, 2698.5 g of the ethanol/water solution and 606 g of the ethyl silicate.

After the completion of addition of the total amount of the compounds to the seed particle dispersion, 204 g of an aqueous NaOH solution (1 wt %) was added to the reaction mixture, and the resulting mixture was held for 2 hours at 70° C. to obtain a dispersion in which silica particles were monodispersed.

Subsequently, the silica particles were separated from this dispersion, and the separated particles were dried at 200° C. to obtain particles for spacer.

A liquid crystal display device was prepared by using the spacer particles thus obtained was then evaluated in the same manner as in Example 1.

EXAMPLE 3

To 974 g of the silica particle dispersion obtained in Example 2 were added simultaneously while maintaining at 65° C. over a period of 19 hours 1103 g of an ethanol/water/ammonia mixed solution (weight ratio 1.0/2.5/0.2) and 627 g of ethyl silicate (28% by weight in terms of $SiO_2$). The resulting dispersion was then maintained at 70° C. for 2 hours. To this dispersion was added at 70° C. over a period of 6 hours 1263 g of the silicic acid solution of Example 1, whereby a monodisperse silica particle dispersion was obtained. Subsequently, the particles for spacer were prepared in the same manner as in Example 1, followed by the same evaluation as in Example 1.

COMPARATIVE EXAMPLE 1

In a mixed solution comprising 486.5 g of ethanol and 398 g of pure water was dissolved 71.7 g of ammonia gas with stirring at 35° C. To the resulting mixture was added 17.4 g of ethyl silicate and stirred for 2 hours, to which was then added 3.3 g of an aqueous NaOH solution (1 wt %). The mixture thus obtained was subjected to ultrasonic wave treatment, whereby a seed particle dispersion was obtained.

To 974 g of the thus obtained dispersion was gradually added with stirring at 35° C. and controlling the pH to 11.5 with ammonia gas a mixed solution of 1508.6 g of ethanol and 3006.8 g of pure water simultaneously with 2268 g of ethyl silicate over a period of 19 hours. To the resulting dispersion was added 204 g of an aqueous NaOH solution (1 wt %, and the mixture was aged for 2 hours by heating at 70° C.

Subsequently, to 46.3 g of the dispersion obtained in the manner as mentioned above were added a mixture of 1356 g of ethanol and 3377 g of pure water, and 2874 g of ethyl silicate and the resultant mixture was aged under the same conditions as above.

Particles separated from this dispersion were dried at 200° C. to obtain the powdery silica particles for spacer.

The measurement of the thus obtained spacer particles with respect to their average particle diameter, CV value and aggregation ratio was conducted in the same manner as in Example 1.

Results obtained are shown in Table 1.

Further, the same liquid crystal display device as in Example 1 was prepared using as a spacer the powdery silica particles obtained above, which was then measured in the same manner as in Example 1 with respect to its cell gap, discoloration and cold bubbles.

Results obtained are shown in Table 2.

TABLE 1

| | Average particle diameter (μm) | CV value (%) | Aggregation ratio (%) |
|---|---|---|---|
| Example 1 | 6.10 | 1.4 | 1.7 |
| Example 2 | 1.00 | 1.8 | 0.2 |
| Example 3 | 1.40 | 1.9 | 0.9 |
| Comparative Example 1 | 6.02 | 2.2 | 17.2 |

TABLE 2

| | Cell gap (μm) | Dispersion (μm) | Irregular color | Cold bubble |
|---|---|---|---|---|
| Example 1 | 5.87 | 0.04 | None | 0 |
| Example 2 | 0.98 | 0.04 | None | 0 |
| Example 3 | 1.37 | 0.05 | None | 0 |
| Comp. Ex. 1 | 5.85 | 0.12 | Slightly observed | 4 |

EXAMPLE 4

A. Preparation of monodisperse silica particles and evaluation thereof

To a mixed solution of 350.2 g of ethanol and 16.4 g of tetraethoxysilane containing no methoxysilanes was added a mixed solution of 350.2 g of ethanol, 78.0 g of 28% ammonia water and 5.4 g of pure water, and the resulting mixture was stirred for 2 hours to obtain a seed particle dispersion. During this operation, the temperature of the reaction mixture ws maintained at 15° C. The seed particles present in the seed particle dispersion obtained had an average particle diameter of 0.19 μm and a CV value of 0.5%, and the dispersion had a solids concentration of 0.59% by weight (calculated as $SiO_2$).

To 800 g of the seed particle dispersion obtained above was added a mixed solution comprising 842.5 g of tetraethoxysilane-B containing methoxysilanes as shown in Table 3, 318 g of 28% ammonia water and 767 g of pure water over a period of 19 hours while maintaining the reaction mixture at 35° C.

Successively, to this reaction mixture was added a mixed solution of 1403 g of ethanol, 477 g of 28% ammonia water and 17 g of pure water, and thereafter to the resulting reaction mixture was added while maintaining at 35° C. a mixed solution comprising 1047 g of the tetraethoxysilane-B, 494 g of ethanol, 395 g of 28% ammonia water and 954 g of pure water over a period of 19 hours.

Furthermore, to 4110 g of the silica particle dispersion obtained above was added a mixed solution of 976 g of ethanol, 527 g of 28% ammonia water and 19 g of pure water, and thereafter to the resulting dispersion was added while maintaining at 35° C. a mixture of 853 g of the tetraethoxysilane-B, 403 g of ethanol, 322 g of 28% ammonia water and 777 g of pure water over a period of 15 hours.

The monodispersed silica particles present in the silica particle dispersion thus obtained had such properties as shown in Table 4.

The average particle diameter of the monodispersed silica particles was measured by means of a particle size measuring apparatus (CAPA-700, manufactured and sold by Horiba Seisaku-Sho K.K.).

B. Preparation of liquid crystal display device and evaluation thereof

Using the silica particles separated from the silica particle dispersion obtained in the above-mentioned manner as a spacer, a liquid crystal display device was prepared by the same manner as in Example 1, and the display device thus obtained was evaluated in the same manner as in Example 1 with respect to the cell gap, discoloration of the displayed images and cold bubbles formed in the display section.

Results obtained are shown in Table 5.

EXAMPLES 5 AND 6

A seed particle dispersion was obtained in each example by repeating Example 4 except that the tetraethoxysilane-A was used in Example 5 and the tetraethoxysilane-B was used in Example 6.

Subsequently, monodispersed silica particles were obtained by repeating the same operation as in Example 4 except that the above-mentioned seed particle dispersion was used.

Using the silica particles obtained above as a spacer, liquid crystal display devices were prepared by the same manner as in Example 1, and the display devices thus obtained were evaluated in the same manner as in Example 1 with respect to the cell gap, discoloration of the displayed images and cold bubbles formed in the display section.

Results obtained are shown in Table 5.

TABLE 3

| | Tetraethoxysilane containing methoxysilanes | | | | |
|---|---|---|---|---|---|
| | Methoxysilanes/ tetraethoxysilane (mol/mol) | $[CH_3O] \cdot [C_2H_5O]_{4-n} \cdot Si$ Added amount ($SiO_2$ mol %) | | | |
| | | n = 4 | 3 | 2 | 1 |
| A | $3.71 \times 10^{-2}$ | 0 | 0 | 0.36 | 3.22 |
| B | $2.43 \times 10^{-2}$ | 0 | 0 | 0.24 | 2.14 |

TABLE 4

| | Average particle diameter (μm) | CV value (%) | Aggregation ratio (%) |
|---|---|---|---|
| Example 4 | 2.42 | 0.6 | 1.0 |
| Example 5 | 2.40 | 1.9 | 0.6 |
| Example 6 | 2.40 | 1.0 | 1.2 |

TABLE 5

| | Cell gap (μm) | Dispersion (μm) | Irregular color | Cold bubble |
|---|---|---|---|---|
| Example 4 | 2.40 | 0.06 | None | 0 |
| Example 5 | 2.41 | 0.07 | None | 0 |
| Example 6 | 2.39 | 0.05 | None | 0 |

EXAMPLE 7

A. Preparation of particles for spacer

To a mixed solution of 487 g of ethanol, 256 g of 28% ammonia water and 205 g of pure water was added 17.4 g of ethyl silicate ($SiO_2$: 28% by weight) with stirring at 35° C., and the stirring was then continued for 2 hours to obtain a seed particle dispersion (A) having dispersed in a water/alcohol mixture the seed particles in an amount corresponding to 0.5% by weight in terms of $SiO_2$.

To 971 g of the seed particle dispersion thus obtained were added simultaneously with stirring at 35° C. a mixed solution of 57 g of ethanol, 44 g of 28% ammonia water and 83 g of pure water, and 418 g of bisacetylacetonato-diisopropoxy titanium ($TiO_2$: 10% by weight) over a period of 6 hours.

The resulting dispersion was then heated at 70° C. and held at that temperature to obtain a dispersion containing particles each formed by laminating $SiO_2$ particle as a core with a $TiO_2$ layer. The dispersion thus obtained was then dried at a temperature of 110° C. to obtain white powders.

Further, the white powders thus obtained were heated in an atmosphere of air at 200° C. for 3 hours to obtain white spherical spacer particles.

B. Evaluation of spacer particle for display device

Following the the same procedure as described in Example 1, the average particle diameter and CV value of the spherical spacer particle thus obtained were obtained.

Further, the light coverage of the above-mentioned spherical spacer particles was obtained in the following manner.

That is, the spherical spacer particles are thoroughly dispersed in an aqueous solution of 40% by weight of glycerol to obtain a dispersion having the concentration of 1% by weight of the particles. The thus obtained dispersion is placed into a quartz cell for measuring transmittance, wherein the thickness of the transmittance layer is 0.5 mm, to measure a transmittance $T_1$ by means of a haze computer.

The optical absorbance $I_1$ corresponding to the transmittance $T_1$ is given by the formula $I_1 = \log(1/T_1)$ Because optical absorbance is proportional to particle concentration, the absorbance of the particles having the particle concentration of 100%, that is, the absorbance $I_{100}$ of the particles themselves, is calculated on the basis of the equation of $I_{100} = 100 I_1 = 100 \log(1/T_1)$.

Further, assuming that the spherical spacer particles to be tested are charged into the display cell in such a manner that the transmitting layers may be filled with said particles connected to one another in the direction of the thickness of said transmitting layers, and taking an absorbance of the particles having a particle diameter of d μm as $I_D$ and taking a transmittance of said particles as $T_D$, the following equations are derived therefrom, because the absorbance is proportional to the thickness of the transmitting layer.

$$I_D = (d/500) \times I_{100}$$
$$= (d/5) \times \log(1/T_1)$$
$$= \log(1/T_D) \text{ and accordingly}$$
$$T_D = (T_1)^{d/5}$$

From $T_D$ obtained by utilizing the above-equations, the light coverage of the spherical spacer particles was calculated according to the following equation.

*Light coverage* $= 100 - T_D$

C. Preparation of display device and evaluation thereof

A liquid crystal display device using the spherical spacer particles obtained above as a spacer between the display electrodes was prepared in the following manner, and the display device thus prepared was evaluated with respect to its characteristics.

First, 1 g of the spacer particles were dispersed in 100 g of an epoxy resin for sealing (a product of Mitsui Toatsu Chemicals, Inc.) to obtain an ink composition. The ink composition thus obtained was applied by means of a screen printer to the periphery of an alignment film of a laminate comprising successively on a polished glass substrate, 2 cm × 2 cm, for liquid crystal display device a transparent electrode and alignment film to obtain a substrate for liquid crystal display device of large size display part.

Subsequently, in a spray booth kept at 60° C. and 3% RH wherein the substrate for liquid crystal display device of large size display part had been placed, a dispersion of 0.01 g of the same spacer particles as above in 1 liter of ethyl alcohol was sprayed over the portion of said substrate, to which no sealing resin had been applied. The substrate thus treated was then pre-dried at 90° C. for 30 minutes, and thereafter this substrate and another substrate having the same structure as above were put on top of each other so that the alignment films thereof could face each other, and the sealing resin was cured by heating at 150° C. for 1 hour under a pressure of 3 kg/cm², whereby a cell for liquid crystal display device of large size display part was prepared. In the same manner as above, there were prepared 10 pieces of the cells in all.

A liquid crystal display device was prepared by injecting a liquid crystal into the portion of the cell for liquid crystal display device, to which no sealing resin had been applied.

The cell for the liquid crystal display device thus prepared was cut off at the central portion, right side portion and left side portion by means of a diamond cutter, and the thickness of these three portions was measured by means of an electron microscope. Table 7 shows the average thickness and dispersion thereof (an average of values of thickness of three portions (central, right and left sides) of 10 cells and a standard deviation).

EXAMPLE 8

To 970 g of the seed particle dispersion (A) obtained by the same procedure as in Example 7 were gradually added with stirring at 35° C. a mixed solution of 58 g of ethanol, 45 g of 28% ammonia water and 101 g of pure water, and 418 g of bisacetylacetonato-diisopropoxy titanium ($TiO_2$: 10% by weight) over a period of 5 hours. To the resulting dispersion were added gradually a mixed solution of 480 g of ethanol, 372 g of 28% ammonia water and 816 g of pure water, and 985 g of ethyl silicate ($SiO_2$: 28% by weight) over a period of 10 hours.

The dispersion thus obtained was heated at 70° C. and kept at that temperature for 2 hours to obtain a dispersion containing particles formed by laminating $SiO_2$ as a core with $TiO_2$ and $SiO_2$ successively.

This dispersion was dried at a temperature of 110° C. and then heat treated in an atmosphere of air at a temperature of 350° C. for 3 hours to obtain such black spherical spacer Using the spherical spacer particles thus obtained, a liquid crystal display device was prepared in the same manner as in Example 7, which was then evaluated in the same manner as in Example 7.

Results obtained are shown in Table 7.

EXAMPLE 9

To 500 g of the seed particle dispersion (A) obtained in Example 7 were added gradually with stirring at 35° C. a mixed solution of 66 g of ethanol, 52 g of 28% ammonia water and 154 g of pure water, and 161 g of methyl silicate ($SiO_2$: 28% by weight) over a period of 5 hours to obtain a seed particle dispersion (C) containing grown $SiO_2$ particles.

To 800 g of the seed particle dispersion (C) were added 349 g of ethanol, 97 g of 28% ammonia water and 279 g of pure water. To the resulting seed particle dispersion (C) were added gradually with stirring at 35° C. a mixed solution of 67 g of ethanol, 52 g of 28% ammonia water and 144 g of pure water, 127 g of the same ethyl silicate as above and 70 g of a zirconium complex ZR-181 (-62 -diketonato zirconium complex produced and sold by NIHON SODA Co., Ltd.) over a period of 3 hours.

The dispersion thus obtained was heated at 70° C. and kept at that temperature for 2 hours to obtain dispersion containing particles formed by laminating $SiO_2$ as a core with a mixture of $SiO_2$ and $ZrO_2$.

The dispersion obtained in this manner was heated at 110° C. to remove the solvent therefrom, whereby such white spherical spacer particles as shown in Table 6 were obtained.

Using the spherical spacer particles thus obtained, a liquid crystal display device was prepared by the same procedure as in Example 7, which was then evaluated in the same manner as in Example 7.

Results obtained are shown in Table 7.

TABLE 6

| Example | Average particle diameter (μm) | CV value (%) | Light coverage (%) |
|---|---|---|---|
| 7 | 1.01 | 1.98 | 22 |
| 8 | 1.01 | 1.98 | 50 |
| 9 | 1.02 | 1.96 | 20 |

TABLE 7

| Example | Cell gap (μm) | Dispersion (μm) |
|---|---|---|
| 7 | 1.05 | 0.05 |
| 8 | 0.98 | 0.04 |
| 9 | 1.05 | 0.05 |

Visual observation was conducted so as to ascertain whether or not aggregated particles are present in the dispersed spacer particles in the display sections of the liquid crystal display devices obtained in Examples 7 to 9, whereupon no aggregated particles were observed.

When images displayed by driving these liquid crystal display devices obtained above were inspected, no irregular density and irregular color were observed in each device and the contrast of the displayed images was excellent.

What is claimed is:

1. A liquid crystal display device comprising a pair of transparent substrates each having formed thereon a transparent electrode, said transparent substrates being arranged so that said transparent electrodes may be opposite to each other through a spacer interposed between said transparent electrodes, and characterized in that said spacer being composed of spherical particles having a coefficient of variation (CV value) in particle diameter of not more than 2% and an aggregation ratio of not more than 5%.

2. The liquid crystal display device as claimed in claim 1 wherein the spacer is composed of spherical particles having a CV value of not more than 1.5%.

3. The liquid crystal display device as claimed in claim 1 wherein the spacer is composed of spherical particles having an aggregation ratio of not more than 3%.

4. The liquid crystal display device as claimed in claim 1 wherein the spherical particles are those obtained by carrying out hydrolysis of tetraethoxysilane added to a water/organic solvent dispersion of seed particles in the presence of methoxysilanes represented by the following formula [I]

$$(CH_3O)_n(C_2H_5O)_{4-n}Si \qquad [I]$$

wherein n is 1-4, thereby depositing a hydrolyzate of said tetraethoxysilane on said seed particles.

5. The liquid crystal display device as claimed in claim 1 wherein the spherical particles are those obtained by adding tetraalkoxysilane and silicic acid solution to a water/organic dispersion of seed particles, and depositing a hydrolyzate of said tetraalkoxysilane and a polymerizate of said silicic acid on said seed particle.

6. The liquid crystal display device as claimed in claim 1 wherein the spherical particles are those obtained by laminating a metal oxide layer on said spherical particles, said metal oxide layer being different in refractive index from said spherical particles.

7. The liquid crystal display device as claimed in claim 4 wherein the spherical particles are black spherical particles obtained by subjecting said spherical particles to heat treatment at a temperature of above 250° C.

8. The liquid crystal display device as claimed in claim 4 wherein the spherical particles are those obtained by coating the surface of said spherical particles with a synthetic resin.

9. The liquid crystal display device as claimed in claim 5 wherein the spherical particles are black spherical particles obtained by subjecting said spherical particles to heat treatment at a temperature of above 250° C.

10. The liquid crystal display device as claimed in claim 6 wherein the spherical particles are black spherical particles obtained by subjecting said spherical particles to heat treatment at a temperature above 250° C.

11. The liquid crystal display device as claimed in claim 5 wherein the spherical particles are those obtained by coating the surface of said spherical particles with a synthetic resin.

12. The liquid crystal display device as claimed in claim 6 wherein the spherical particles are those obtained by coating the surface of said spherical particles with a synthetic resin.

13. The liquid crystal display device as claimed in claim 7 wherein the spherical particles are those obtained by coating the surface of said spherical particles with a synthetic resin.

14. The liquid crystal display device as claimed in claim 9 wherein the spherical particles are those obtained by coating the surface of said spherical particles with a synthetic resin.

15. The liquid crystal display device as claimed in claim 10 wherein the spherical particles are those obtained by coating the surface of said spherical particles with a synthetic resin.

* * * * *